US012421101B2

(12) United States Patent
Boscaro et al.

(10) Patent No.: US 12,421,101 B2
(45) Date of Patent: Sep. 23, 2025

(54) VALVE ASSEMBLY FOR A FILLING MACHINE AND A FILLING MACHINE PROVIDED WITH SUCH VALVE

(71) Applicant: MBF S.p.A., Veronella (IT)

(72) Inventors: Giuliano Boscaro, Veronella (IT); Paolo Albertini, Veronella (IT)

(73) Assignee: MBF S.p.A., Veronella (IT)

( * ) Notice: Subject to any disclaimer, the term of this patent is extended or adjusted under 35 U.S.C. 154(b) by 4 days.

(21) Appl. No.: 18/660,813

(22) Filed: May 10, 2024

(65) Prior Publication Data

US 2024/0383741 A1 Nov. 21, 2024

(30) Foreign Application Priority Data

May 15, 2023 (IT) ........................ 102023000009732

(51) Int. Cl.

*B67D 7/36* (2010.01)
*B67C 3/26* (2006.01)
*B67D 7/00* (2010.01)

(52) U.S. Cl.

CPC .............. *B67D 7/36* (2013.01); *B67C 3/2614* (2013.01); *B67D 7/005* (2013.01)

(58) Field of Classification Search

CPC .......... B67C 7/36; B67C 7/005; B67C 3/2614
USPC ............................................................ 141/57
See application file for complete search history.

(56) References Cited

U.S. PATENT DOCUMENTS

| | | | | |
|---|---|---|---|---|
| 2,621,845 | A * | 12/1952 | Meyer | B67C 3/2628 251/120 |
| 4,979,546 | A * | 12/1990 | LaWarre, Sr | B67C 3/26 141/147 |
| 7,299,833 | B2 * | 11/2007 | Ruble | B67C 3/281 141/144 |
| 10,773,446 | B2 * | 9/2020 | Bast | B29C 49/36 |
| 2020/0255280 | A1 | 8/2020 | Graffin | |

FOREIGN PATENT DOCUMENTS

| | | | |
|---|---|---|---|
| EP | 0341627 | A1 | 11/1989 |
| EP | 3792527 | A1 | 3/2021 |

* cited by examiner

*Primary Examiner* — Timothy L Maust
(74) *Attorney, Agent, or Firm* — CANTOR COLBURN LLP

(57) ABSTRACT

A valve assembly for a machine for filling containers with a liquid has an adduction conduit extending along a valve axis and connectable to a tank of the filling machine to allow inflow of the liquid through a discharge mouth. A shutter arranged inside the adduction conduit and moving along the valve axis between a closing position and one or more opening positions has an annular gasket that with the shutter in the closing position sealingly engages an abutment seat. The annular gasket has a first annular portion for sealingly engaging a first portion of the abutment seat, and a second annular portion for sealingly engaging a second portion of the abutment seat. At least one flow window interrupts an annular continuity of the second annular portion and allows a partialized flow of liquid through the adduction conduit when the first annular portion is spaced apart from the abutment seat.

17 Claims, 10 Drawing Sheets

VALVE ASSEMBLY FOR A FILLING MACHINE AND A FILLING MACHINE PROVIDED WITH SUCH VALVE

CROSS-REFERENCE TO RELATED APPLICATION

This application claims priority to and benefit of Italian Patent Application No. 102023000009732 filed May 15, 2023, the contents of which are incorporated by reference in their entirety.

FIELD OF APPLICATION

The present invention relates to a valve assembly for a filling machine and to a filling machine provided with such valve.

PRIOR ART

Rotary filling machines are traditionally provided with a fixed support structure whereupon a rotating turret is revolvingly mounted. The latter carries mounted a cylindrical tank wherein a liquid to be bottled is contained. In particular, the tank is filled with the liquid to be bottled up to a certain height level, whereabove it is filled with an inert gas (for example nitrogen). Such inert gas is maintained substantially at atmospheric pressure in the case of gravity filling machines, under slight vacuum in the case of slight negative pressure and under pressure in the case of isobaric filling machines.

Beneath the tank there is peripherally attached a plurality of valve assemblies suitable for conveying the liquid contained within the tank into underlying containers to be filled, such as bottles, resting on corresponding plate support structures.

Each valve assembly comprises an adduction conduit in communication with the tank, intercepted by a shutter that adjusts the inflow of the liquid from the tank to the underlying container. The fluidic seal between the shutter and the adduction conduit with the shutter in a closed position is ensured by a gasket made of an elastomeric material that is associated with said shutter.

Each valve assembly is provided with a conduit to evacuate gas exiting the container during filling.

Operationally, the container is fluidically associated with the corresponding valve assembly by the raising of the corresponding plate support structure, with the mouth of the container being brought into sealed conditions with the adduction conduit of the valve assembly.

The shutter of the adduction conduit is then opened to allow liquid to be dispensed into the container, and the air present within the container is conveyed into the tank or a discharge circuit (at the same pressure as the tank).

As a function of the criterion wherewith the filling of the container is interrupted, filling machines may be distinguished as weight, volumetric and level based.

In more detail, in level filling machines the container is filled up to a predetermined distance from the opening thereof, a distance known as the "level" and which is established by the manufacturer of the container itself. When the container is filled to this level the volume of contained product is equal, within certain tolerances, which are always indicated by the container manufacturer, to the volume of liquid indicated on the label of the product sold.

The level may be obtained "hydraulically" or through "electronic" control.

In "hydraulic" filling valves the cessation of the liquid transfer is determined by hydraulic effects, independently of the closing of the shutter. In these valves, the air evacuation conduit comprises a cannula that is inserted inside the container during filling and wherethrough air passes in exiting the container. Such conduit (called an "air return cannula") has a lower open end which is intended to be inserted inside the container to be filled and an upper open end which is fluidically connected to the tank, or to a possible discharge circuit, in order to convey into the latter the air coming from the container during filling. When the liquid dispensed into the container reaches the lower end of the air return cannula obstructing it, the gas within the container may no longer escape, and the flow of liquid is stopped. In such situation, a residual quantity of liquid rises up inside the air return cannula until reaching the same elevation as the liquid level within the tank, according to the known principle of communicating vessels, consequently resulting in the interruption of the supply of the liquid within the container.

Also in "electronic" level filling valves there is a conduit for the evacuation of the gas, which however—unlike "hydraulic" level valves—does not necessarily comprise a cannula to be introduced into the container. A probe or ON/OFF sensor is introduced into the bottle. When the liquid transferred into the container arrives at the established level, the sensor "drives" the closing of the shutter, interrupting the descent of the liquid.

A common need for all types of filling machines is that of modulating the dispensed liquid flow rate during the various steps of filling containers.

In particular, there is the need to modulate the dispensing of the liquid even at low flow rates (less than 20 ml/s), for example, in order to reduce the formation of foam during the initial filling steps or to finely control the filling level of the containers.

Such requirement is not, however, satisfied by current valve assemblies because of the non-progressive response to the movements of the shutter by the gasket made of elastomeric material in proximity to the closing position of the shutter, namely in the positions relative to the low flow rates. Such behavior is tied to the compression (when closed) and the decompression (when open) of the elastomeric material whereof the shutter gasket is formed.

In particular, in FIG. 13 is represented the curve (diamond-shaped points) relating to the volumetric flow rate as a function of the degree of opening of the shutter in a valve assembly with the shutter being provided with a known type of water-tight gasket.

As may be seen during the step of opening (and of closing) of a known valve assembly, there is an initial opening stroke with a null flow rate that is due to the decompression of the sealing rubber, and then suddenly, within a few hundredths of raising the shutter, the flow rate spikes up to already 20 percent of the maximum value thereof. This is the reason why all modulating process valves are not normally used below 10-15% of opening, insofar as it is a poorly controllable area.

In the field of filling machines the need therefore continues to be felt to regulate the dispensing of liquid even at low flow rates, namely below 10-15% of the shutter opening.

SUMMARY OF THE INVENTION

In this situation, the main object of the present invention is that of solving all or in part, the inconveniences of the prior art by providing a valve assembly for a filling machine that makes it possible to regulate the dispensing of liquid even at low flow rates.

A further object of the present invention is to provide a valve assembly for a filling machine which is simple and cost-effective to manufacture.

BRIEF DESCRIPTION OF THE DRAWINGS

The technical features of the present invention, according to the aforementioned objectives, may be clearly seen in the content of the claims hereinbelow, and the advantages thereof will become more readily apparent in the detailed description that follows, made with reference to the accompanying drawings, which represent one or more purely exemplifying and non-limiting embodiments thereof, wherein:

Figure 1:
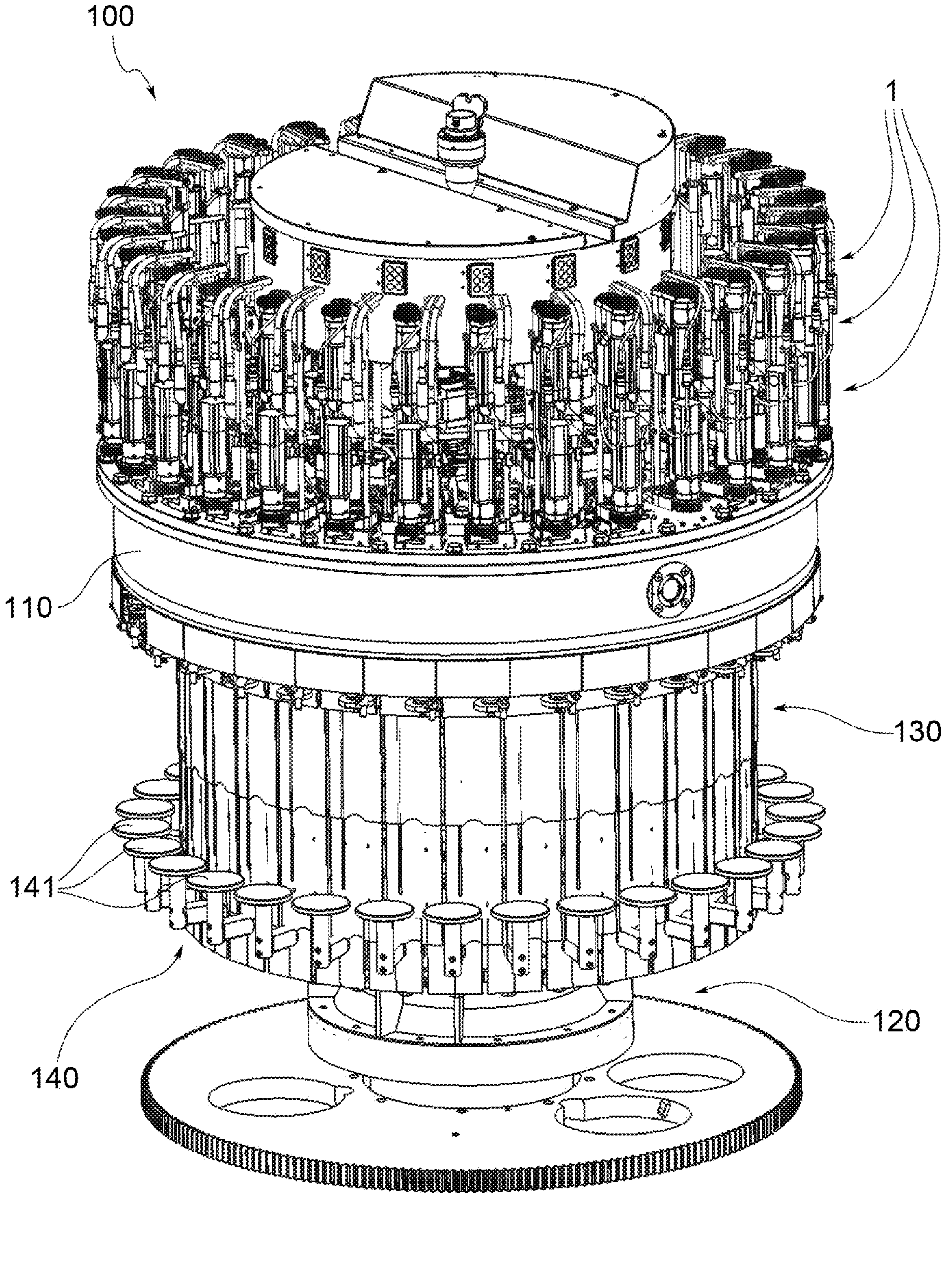
FIG. 1 is a perspective view of a filling machine, according to one embodiment of the present invention.
Figure 2:
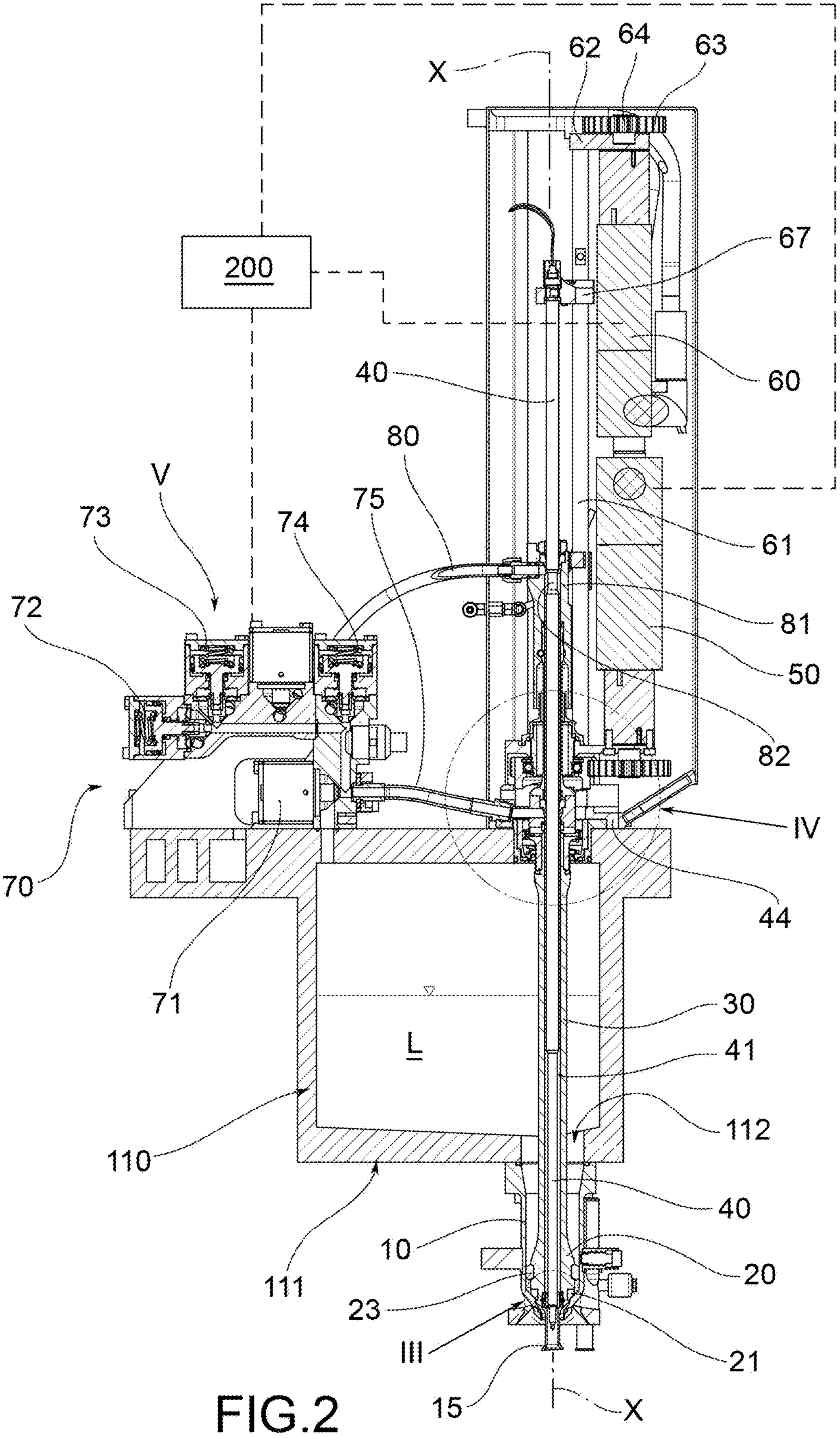
FIG. 2 shows a cross-section view of a portion of the filling machine of FIG. 1 taken along a radial cross-section plane in relation to the axis of rotation of the machine at the valve assembly according to the present invention.
Figure 9A:
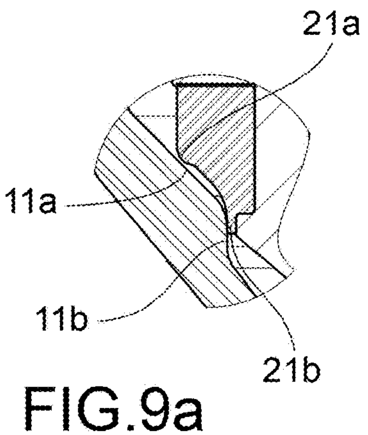
FIG. 9 shows a cross-sectional view of a detail of the valve assembly of FIG. 2 shown with the adduction conduit sealingly engaged by a bottle to be filled wherein the shutter is in a partially open position and the level control device is in a second extracted position.
Figure 9B:
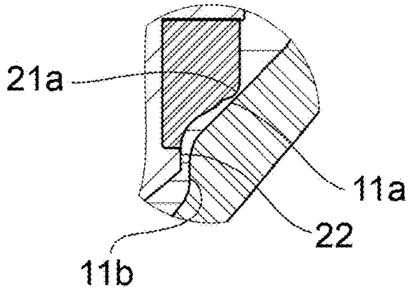
Figure 9:
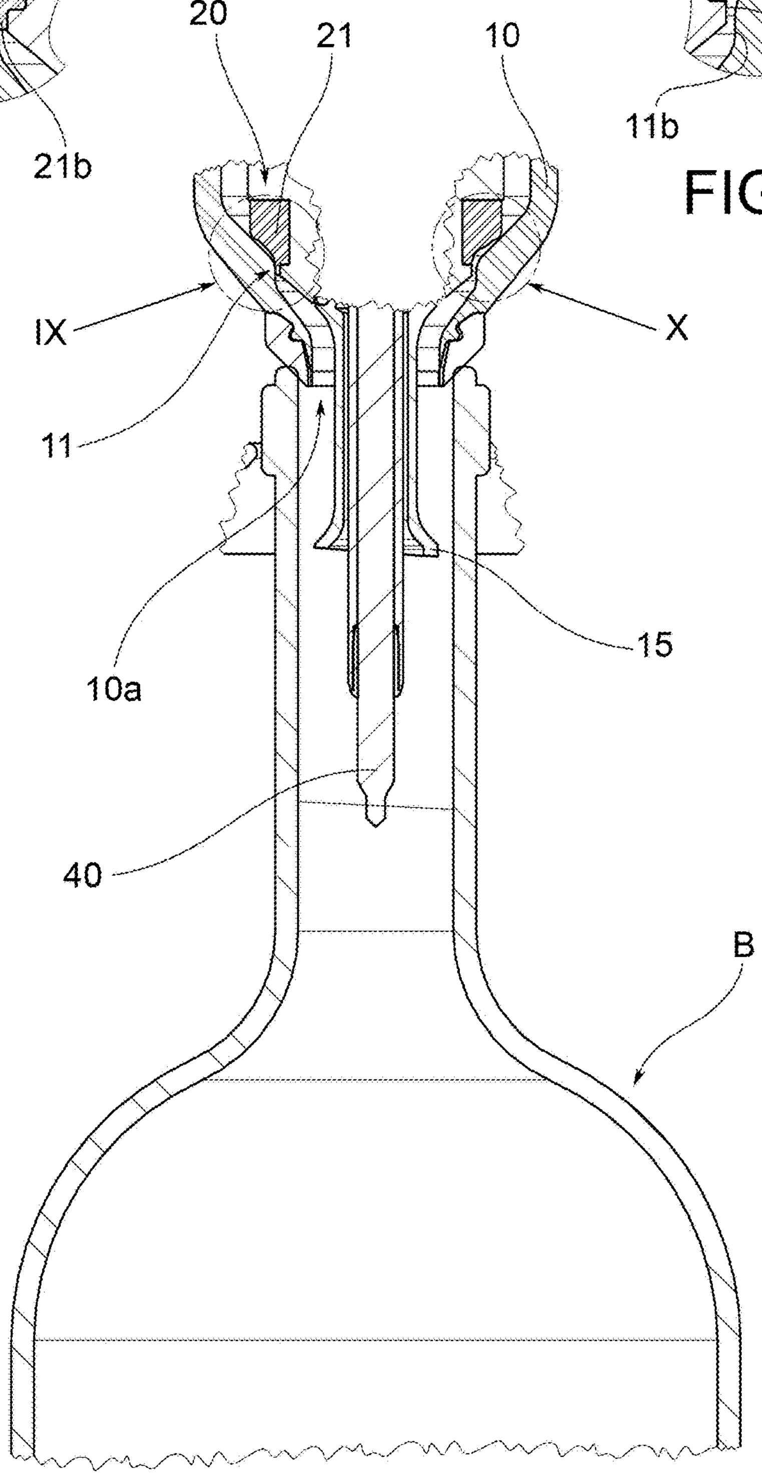
Figure 10:
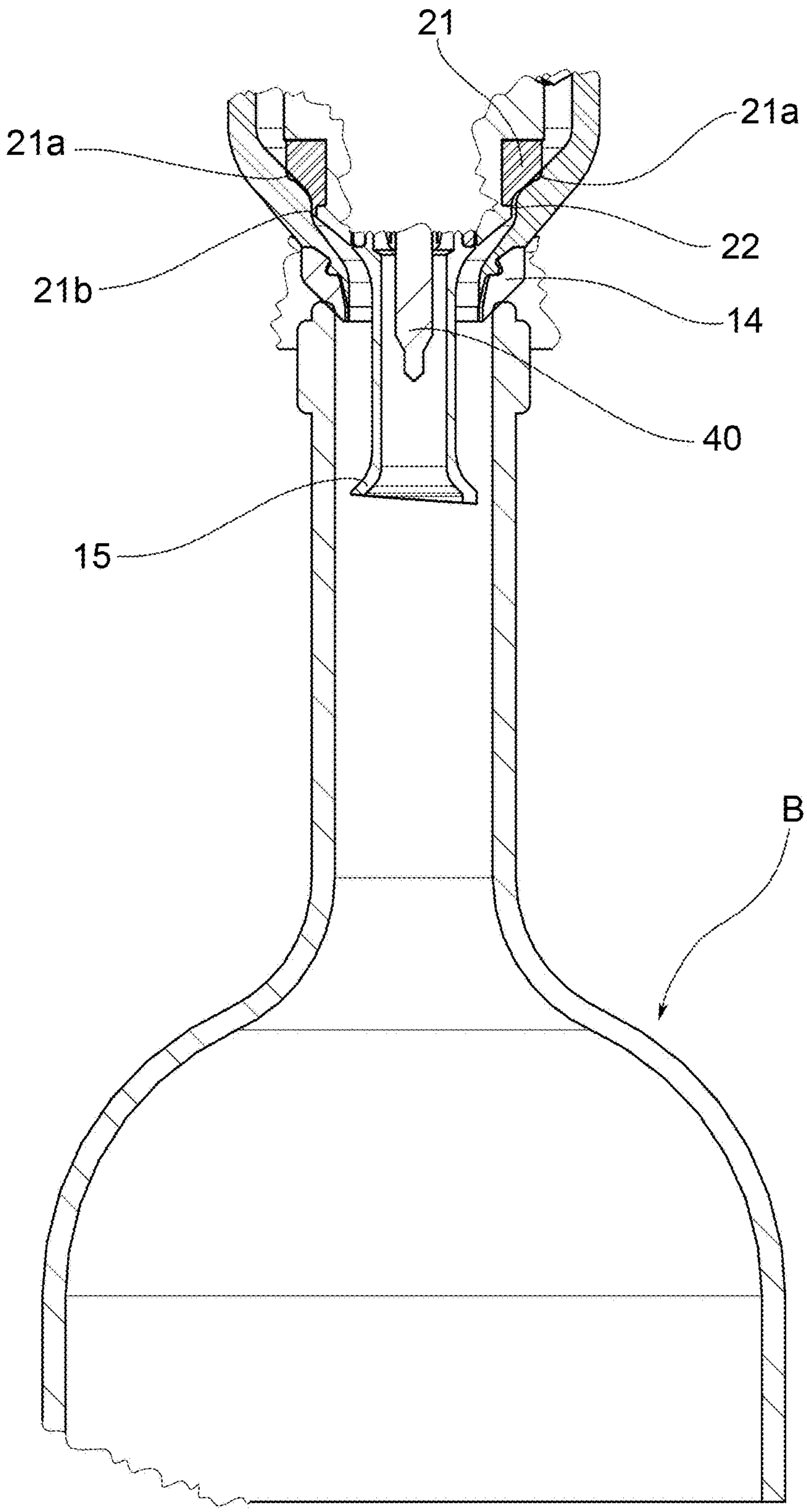
Figure 11:
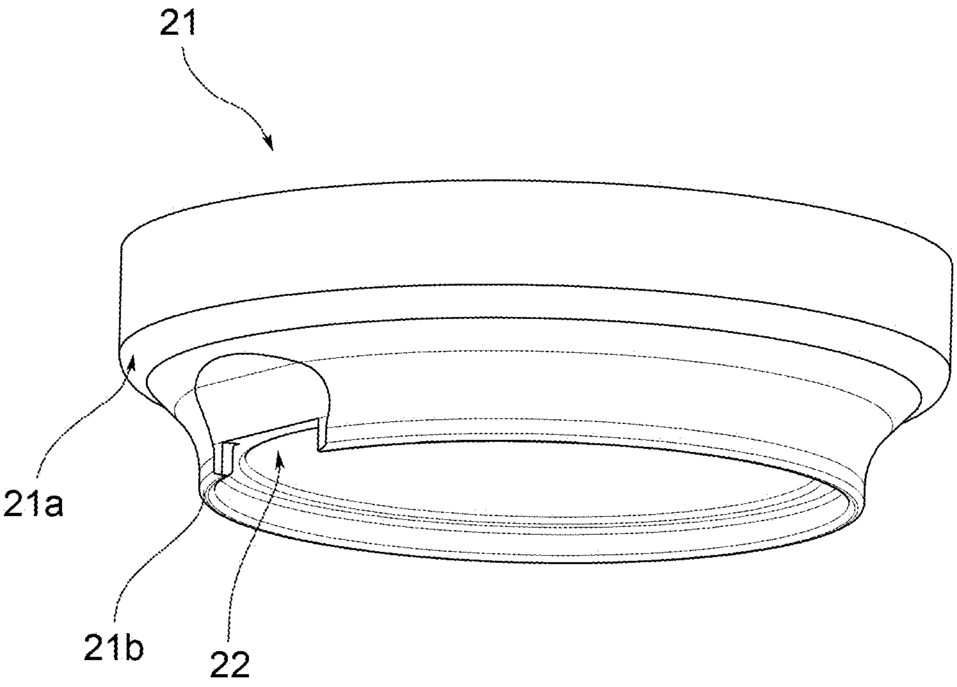
Figure 12:
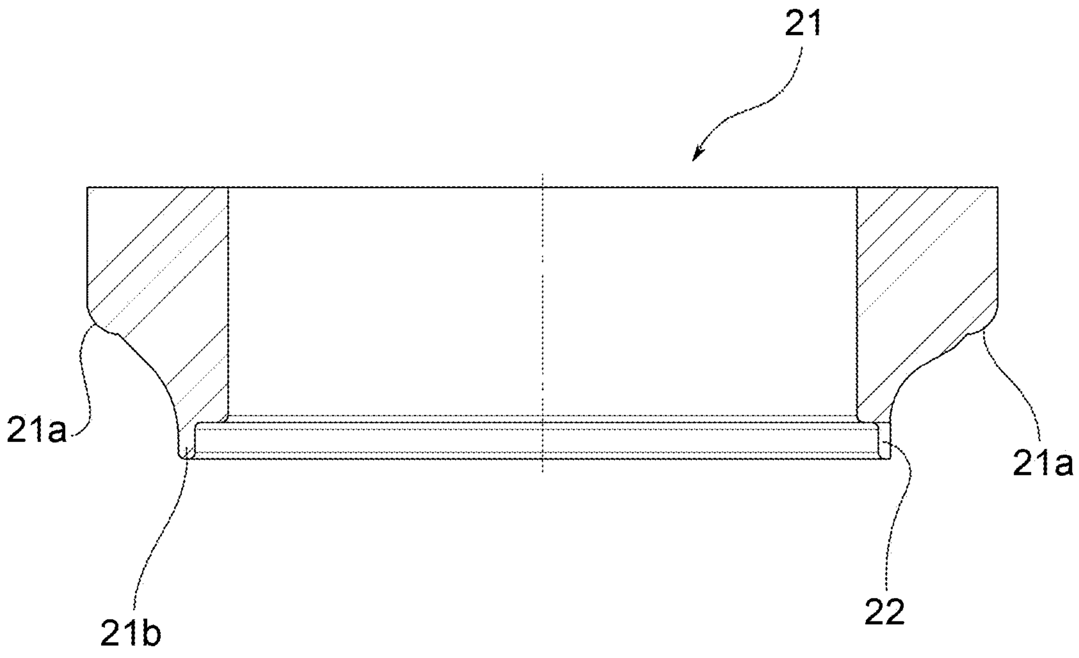
Figure 13:
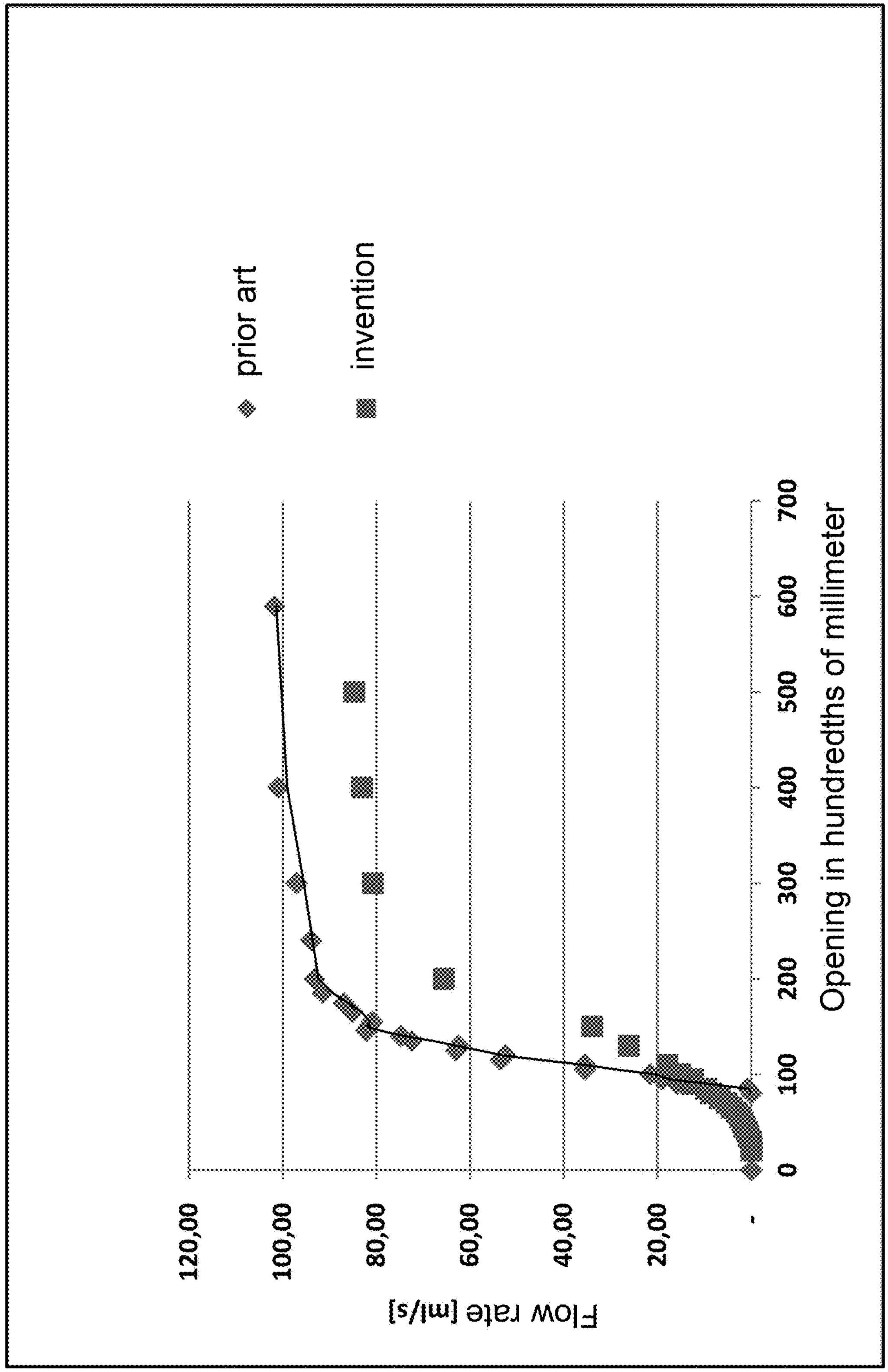

FIG. **9*a* shows an enlarged view of a detail from FIG. 9**, enclosed in the circle denoted therein by IX and in relation to a first portion of a shutter water-tight gasket;

FIG. **9*b* shows an enlarged view of a detail from FIG. 9**, enclosed in the circle denoted therein by X and in relation to a second portion of a shutter water-tight gasket wherein a flow window is provided;

FIG. 10 shows a cross-sectional view of a detail of the valve assembly of FIG. 2 shown with the adduction conduit sealingly engaged by a bottle to be filled wherein the shutter is in a closed position and the level control device is in a second retracted position;

FIG. 11 shows a perspective view of a component of the valve assembly shown in FIG. 2 and in relation to a water-tight shutter gasket;

FIG. 12 shows a cross-sectional view of the gasket of FIG. 11 according to a diametrical cross-sectional plane passing through a flow window; and FIG. 13 shows two graphs relating to the volumetric flow rate as a function of the opening extent of the shutter, respectively, in a valve assembly with a shutter that is provided with a known water-tight gasket and in a valve assembly with a shutter that is provided with the water-tight gasket of FIG. 11.

DETAILED DESCRIPTION

With reference to the accompanying drawings a valve assembly according to the present invention has been indicated collectively by reference numeral 1 and a machine for filling containers with liquids that is equipped with the valve assembly 1 has been indicated by reference numeral 100.

Initially it is the valve assembly 1 that will be described and subsequently the filling machine 100.

The valve assembly 1 for a machine for filling containers with liquids is suitable for regulating the filling of a container B with the liquid contained within a tank of said filling machine and to this end it is fluidically connected to the tank.

According to one general embodiment of the invention, as shown in particular in FIG. 2, the valve assembly 1 comprises an adduction conduit 10 that extends along a valve axis X and that is fluidically connectable to the tank 110 of the filling machine 100 to enable the inflow of said liquid from the tank 110 to the container B to be filled through a discharge mouth **10*a***.

In more detail, the adduction conduit 10 is defined by a tubular body that is coaxial to valve axis X. Such tubular body is intended to be mechanically connected to the bottom 111 of the tank, externally thereto, in such a way as to fluidically connect itself to a discharge opening 112 provided on the bottom 111 of the tank at a first end opposite to that wherein said discharge mouth **10*a*** is obtained.

The valve assembly 1 comprises a shutter 20 that is suitable for regulating the inflow of said liquid into said container B through the adduction conduit 10.

Figure 8:
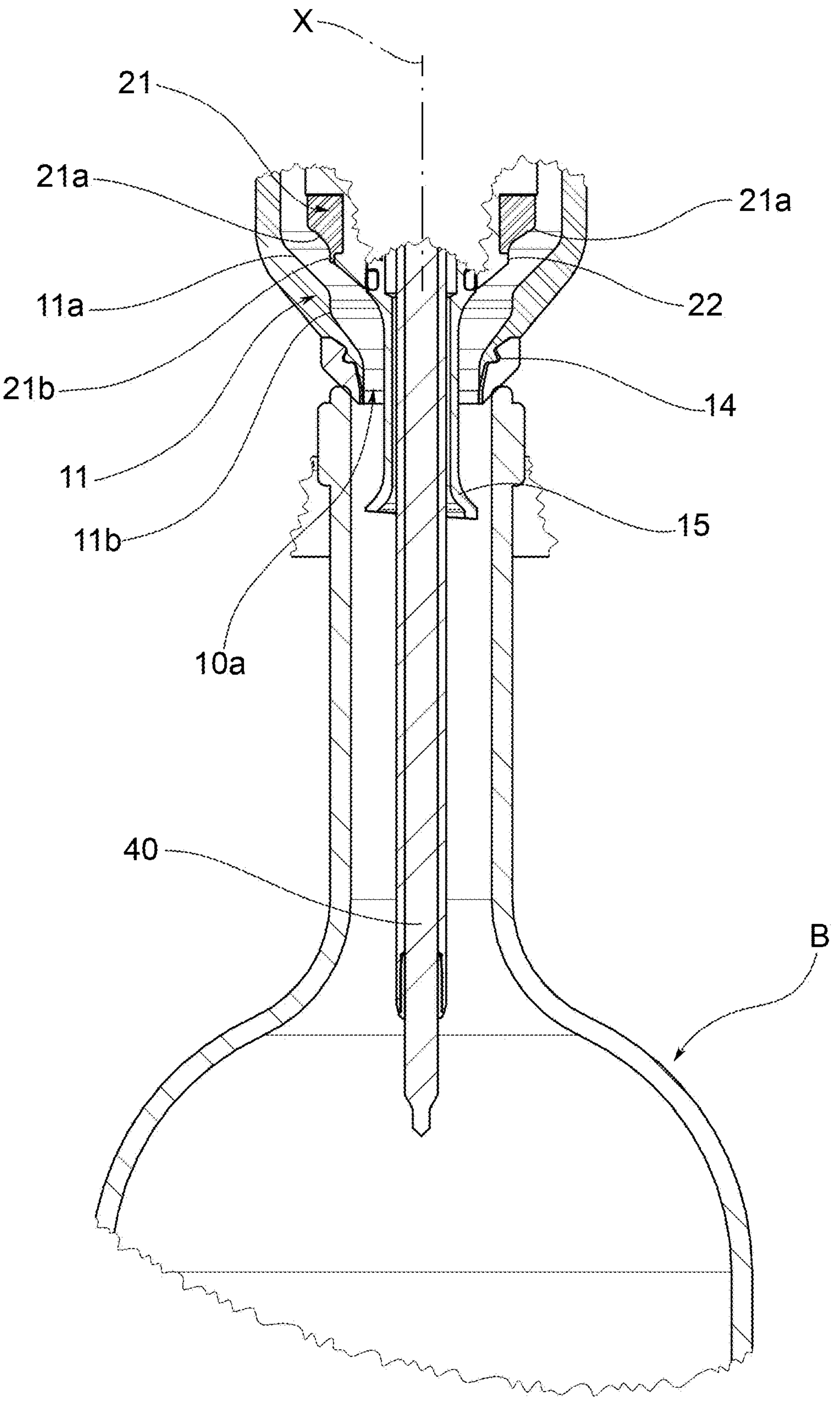
FIG. 8 shows a cross-sectional view of a detail of the valve assembly of FIG. 2 shown with the adduction conduit sealingly engaged by a bottle to be filled wherein the shutter is in a completely open position and the level control device is in a first extracted position.

As shown in FIGS. 8, 9 and 10, the shutter 20 is movably arranged inside said adduction conduit 10 in order to be moved along the valve axis X between a closing position, wherein the shutter intercepts the adduction conduit 10 closing the flow section towards the discharge mouth **10*a* (see FIG. 10), and one or more opening positions, in which the shutter does not intercept (see FIG. 8) or only partially intercepts (see FIG. 9) the adduction conduit 10 leaving a flow section towards the discharge mouth 10*a*** open.

The shutter 20 preferably carries an associated deflector 15 that extends coaxially from the lower end of the shutter 20 and is suitable for inserting itself in use into the container B in order to guide the liquid out of the discharge mouth **10*a* towards the walls of the container B. In the preferred case wherein the container is a bottle B, the deflector 15** inserts itself into the initial part of the neck of the bottle.

In order to ensure a seal between the shutter 20 and the adduction conduit 10 the shutter 20 comprises an annular gasket 21 (coaxial to the shutter) that sealingly engages an abutment seat 11 with the shutter in the closed position.

In more detail, the abutment seat 11 is obtained internally to said adduction conduit 10 in proximity to the discharge mouth **10*a*** and is concentric to the valve axis X.

Figure 5:
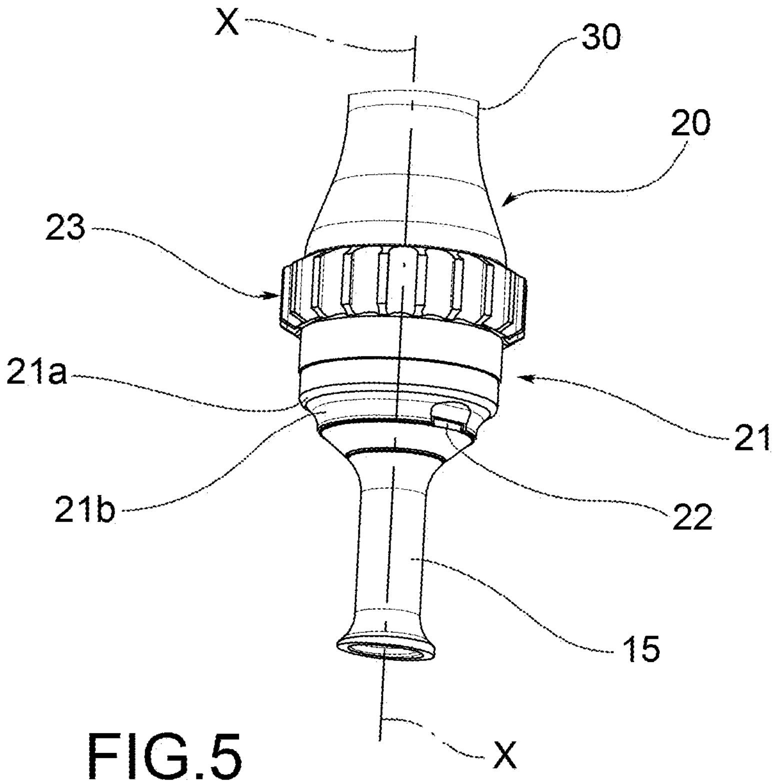
FIG. 5 shows a perspective view from the bottom of the shutter of the valve assembly of FIG. 2.
Figure 7:
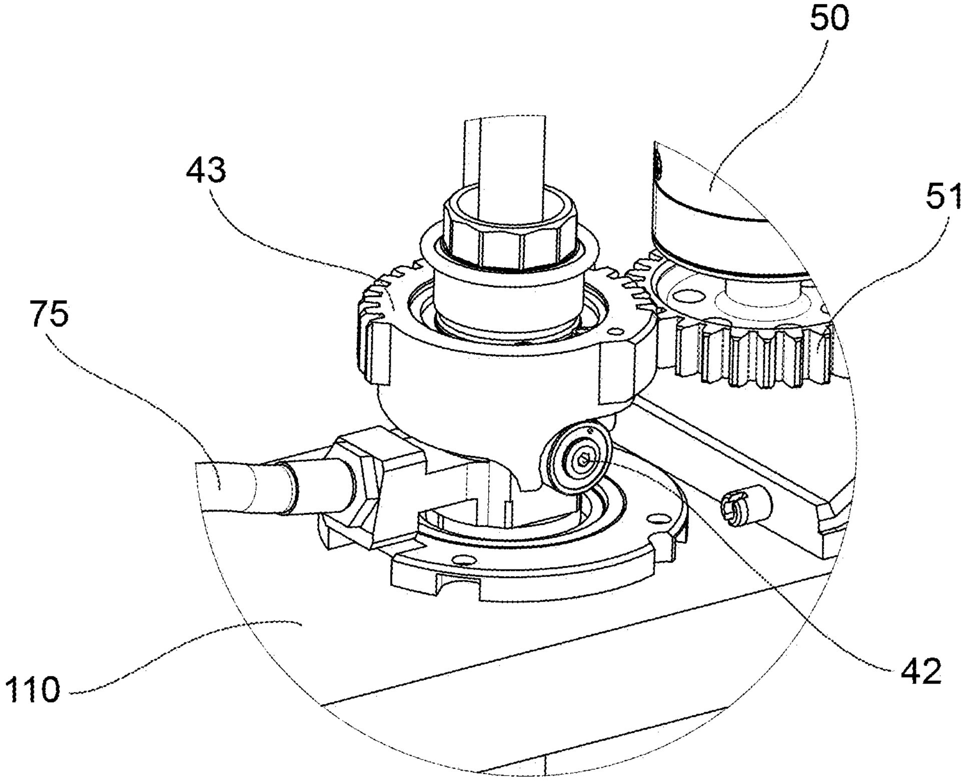
FIG. 7 shows a perspective view of a detail of the valve assembly of FIG. 6 in relation to the area of mechanical interconnection between the first movement means and a tubular control stem for moving the shutter.
Figure 6:
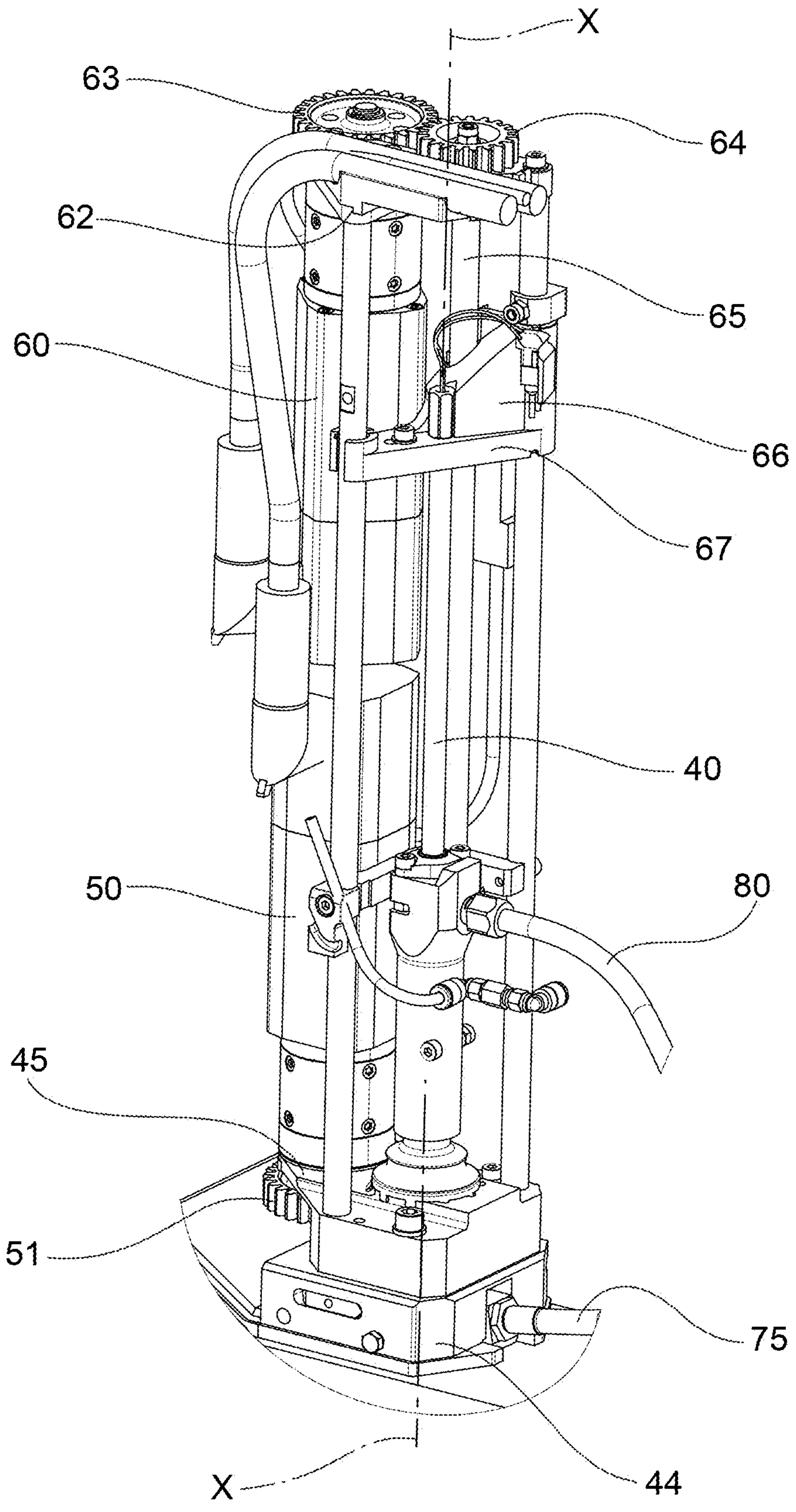
FIG. 6 shows a perspective view of a detail of the valve assembly of FIG. 2 in relation to the means for moving the shutter and the optic fiber probe.

Advantageously, as shown in FIG. 5, the shutter 20 may be provided with a centering guide 23 consisting of an annular strip that is coaxial to the valve axis X and wherefrom a plurality of radial fins extend wherebetween there remain delimited conduits for the free passage of liquid. The radial fins are intended to slide along a cylindrical portion of the adduction conduit, acting as centering elements for the shutter inside the adduction conduit.

In accordance with the preferred embodiment of the present invention shown in the accompanying figures, the valve assembly 1 further comprises a tubular control stem 30 for controlling the shutter 20.

In more detail as shown in FIG. 2, the tubular control stem 30:

internally defines a conduit that extends axially along the valve axis X and that is open at both ends, and is intended to pass through the tank 110 in order to protrude therebelow with a lower end inside the adduction conduit and with an upper end thereabove.

The shutter 20 is coaxially associated with the lower end of said stem 30.

Advantageously, the valve assembly 1 comprises first movement means 50 for moving the shutter 20 which are kinematically connected to the tubular control stem 30.

Preferably, the valve assembly 1 further comprises a device 40 for controlling the filling level of the container.

The device 40 is coaxially inserted inside the axial conduit defined by the control stem 30 to be moved between at least one extracted position, wherein it exits from said conduit so as to be inserted inside the container B (see FIGS. 8 and 9), and a retracted position, wherein it does not exit from said conduit so as not to engage the container B (see FIG. 10).

In particular, as shown in FIGS. 8, 9 and 10, the device 40 is coaxially inserted inside the deflector 15, which consists of a tubular extension of the control stem 30.

Advantageously, the valve assembly 1 comprises second movement means 60 for moving the device 40 for controlling the filling level of the container, which are kinematically connected to said device 40.

The device 40 for controlling the filling level of the container may consists of a gas return cannula which is fluidically connectable selectively to the tank or to a plurality of circuits of the filling machine by respective valves V, preferably installed in a valve block 70.

In accordance with the preferred embodiment shown in the accompanying figures, the device 40 for controlling the filling level of the container comprises a level detection probe.

The probe may be of any type suitable for the purpose.

Preferably, the probe 40 is a refraction optic fiber probe 40 for detecting the filling level of the container.

The optic fiber probe is known per se and will not be described in detail. Only highlighted is the fact that compared to other types of probe, such as conductive probes or capacitive probes, an optic fiber probe has a short latency (less than a millisecond) and is at the same time capable of discriminating liquid from foam, sufficient to enable the implementation of a very precise control system.

Also a conductive probe exhibits immediate response (depending upon the signal conversion electronics), but has difficulty in discriminating against foam which nonetheless acts as a conductor. Waveguide- or capacitive-type level probes exist, but they currently exhibit much slower response times.

The latency of an optic fiber probe is less that a millisecond. The detection frequency of an optical probe may preferably be set to one measurement every millisecond, insofar as this corresponds to the sampling frequency of a PLC and to a value that is sufficiently short for the purpose.

Advantageously, between the internal wall of the tubular stem 30 and the probe 40, an annular gap 41 is defined which acts as an air return conduit and is fluidically selectively connectable to the tank or to a plurality of circuits of the filling machine by respective valves, preferably installed in a valve block 70.

Preferably, the first movement means 50 comprise a first electric motor 50 kinematically connected to said tubular control stem 30 to move the shutter 20 between the closing position (see FIG. 10) and said one or more opening positions (see FIGS. 8 and 9).

Preferably, the second movement means 60 comprise a second electric motor 60 kinematically connected to said device 40 to move it with respect to said control stem 30 between said at least one extracted position (see FIGS. 8 and 9) and said retracted position (see FIG. 10).

Preferably, said first 50 and second electric motors 60 are independently controllable therebetween in order to regulate respectively:

the axial position of the shutter along the valve axis X with respect to the abutment seat so as to adjust the amplitude of the flow section during the filling of the container, and the position of the device 40 inside the container to be filled so as to adjust the filling level controllable by means of said device.

By virtue of the use of two independently controllable electric motors, in the case wherein the device 40 is a level probe, the valve assembly 1 makes it possible to implement the regulation of the bottle level using flow partialization adapting itself in a flexible manner to variations in the shape of the bottle.

Operationally, the liquid level rate of ascent must be as high as possible during the filling of the bottle, whilst it must be as low as possible (also at a value of 5%) when the neck of the bottle is filling in order to obtain a rate of ascent that is sufficiently slow to allow the probe to detect the level and to allow the shutter to close itself without, in the meantime, compromisingly changing the level.

The use of two independent motors 50 and 60 makes it possible to control both the position of the shutter and the position of the probe in an independent and precise manner. By virtue of such control is it possible to flexibly adjust the position of the probe and the opening of the shutter to various bottle shapes, thereby efficiently managing the filling by means of flow partialization that is calibrated for each bottle format.

Operationally, in accordance with the preferred embodiment, the valve assembly 1 may be managed in the following preferred manner.

By means of the second electric motor 60 the probe 40 is arranged at the constriction of the neck of the bottle B (container to be filled). This first position of the probe defines the filling level of the bottle where there is a transition from full-flow filling to partialized flow filling before the flow stops. As soon as the liquid level reaches the probe, the filling flow rate is partialized in regulating the position of the shutter and the probe is moved to a second position corresponding to the required filling level. As soon as the liquid level again reaches the probe, the shutter is closed and the filling is interrupted.

By virtue of the operational flexibility provided by the second electric motor 60 the first probe position may be controlled in a very precise manner. It is therefore possible to choose such first position as a function of the bottle format based upon preset data.

In more detail, each bottle format has, in particular, a different neck conformation. It follows that as the shape of the neck varies, so does the height position relative to the bottom of the bottle of the transition zone from the full section of the bottle to the restricted section of the neck. Such transition zone is important since thereabove it is opportune to proceed with filling the bottle using a partialized flow rate so as to have the possibility of precisely controlling the filling, thereby avoiding sudden and difficult-to-control rises in the fluid level at the neck of the bottle.

Operationally, the first position of the probe 40 is chosen as a function of the transition zone. The use of an electric motor for the positioning of the probe makes it possible to perform such positioning in an extremely precise manner, so as to adapt itself smoothly to various bottle formats.

Concurrently, the use of an electric motor for moving the shutter makes it possible to regulate the axial position of the shutter itself in a very precise manner, thus making it possible to control the partialization of the flow of liquid.

Advantageously, the filling may not only be managed using partialization of the flow rate but also using multiple partializations using multiple level detection points. For example, after the fast filling step, a first partialization of the flow rate may be performed (40% for example) at a first filling level having, for example, the objective of absorbing the foam. Subsequently, having reached a second filling level (greater than the first one by some centimeters), partialize again within the last section in order to make the final level. In other terms, those points wherein the liquid is detected using the probe may also be more than two.

The use of motors for the positioning of the shutter and for the positioning of the probe enable the implementation of additional measures listed below:

- slowly opening the valve assembly so as to create less disturbance in the initial descent of the liquid,
- regulating the opening of the shutter according to the foaminess of the wine,
- positioning the flow partialization level where it is deemed most appropriate both to reduce the overall filling time and to better manage the foam, and
- regulating the slow flow rates according to the type of bottle being treated.

Controlling the speed of movement of the probe makes it furthermore possible to measure the effective level of the liquid at the moment the probe is retracted thereby performing a form of level control.

According to the embodiment shown in the accompanying figures, the containers B to be filled are abutted against a water-tight bottle gasket 14 associated with the discharge mouth 10*a* in a position that is coaxial to the flow deflector 15, the optic fiber probe 40 and the adduction conduit 10, in addition to the shutter 20.

The tank 110 contains the liquid to be filled L to a controlled level. Such liquid fills, by gravity, the entire adduction conduit 10 up to the annular gasket 21 housed within the shutter 20. Above the liquid there is gas that may be contained under pressure; the tank is closed above using a membrane 16 that separates the food area from the unsanitized control area. At the upper part thereof the tank 110 supports the valve block 70 with housed valves V which functionally manage the filling process. The shutter 20 is guided by the centering guide 23 and by a piston 24 and supports the deflector 15 at the lower end thereof. When the shutter is raised, a free conduit is formed for the liquid which descends through the adduction conduit 10, crosses the discharge mouth 10*a*, lapping the deflector 15 up to the container arranged below.

In accordance with the present invention, as will be described hereinafter, the annular gasket 21 has a special shape that enables a more controlled outflow compared to normal gaskets in the case of small shutter openings.

As already described, the shutter 20 has a tubular shape and houses the probe 40, preferably of the refraction optic fiber type, therewithin. The probe slides vertically, guided by the deflector 15 and by a guide element 27 (arranged above the tank) and forms, together with the shutter 20, the annular gap 41 which acts as an air return conduit and as a channel of communication with the valves V. The conduit defined by the gap 41 is diverted through a gasket 26, a block 25 and a flexible tube 75 up to the valve block 70 where it may be placed in communication with:

- the tank by opening a first valve 71,
- a degassing circuit by opening a second valve 72,
- a pressurized degassing circuit by opening a third valve 73; and
- a vacuum circuit by opening a fourth valve 74.

Mechanisms for moving the shutter 20 and the probe 40 are housed above the tank 110.

The mechanism for moving the shutter 20, i.e., the first movement means 50, will now be described.

In more detail, the shutter 20 is integral to the block 25 due to the blocking between a striker 24 and a manifold 28. The block 25 is laterally mounted on two bearings 42 which roll on a cam 43. The shutter is thus pressed against the cam 43 by the spring 44 (which acts upon the piston 24 that is integral to the shutter 20) and regulated in height during filling by the cam 43 itself which is positioned by controlling the angular position thereof. The block 25 also performs anti-rotation in dragging on the walls of a base plate 44 that is integral to the tank 110. The base plate 44 is made of a plastic material so as to isolate the tank which is subject to sanitization with respect to the movement control area which is not subject to sanitization.

The base plate 44 is in turn integral to the support element 45 which is configured to support the first electric motor 50 using the pinion 51 thereof and a support bush 52. The latter is integral to the bearing 42 which, in turn, makes the gear wheel with the cam 43 to rotate. The pinion 51 makes the gear wheel 43 to rotate, which, being conformed with a cam at the bottom, presses down on the bearings 42, which are integral to the shutter 20, and causes the opening or closing of the flow insofar as the spring 44, as mentioned, is always pushing the shutter upwards. The support bush 52 is screwed onto the support element 45 and is blocked by a protection cover 46 in such a way as to regulate the shutter closure force on the basis, also, of the effective dimensions of the tank 110 as regards the distance between the abutment seat 11 of the annular gasket 21 and the fixing plane of the base plate 44.

The mechanism for moving the probe 40, i.e., the second movement means 60, will now be described.

In more detail, the mechanism for moving the probe 40 comprises two guides 61 which are integral to the base plate 44. The probe 40 is associated with a carriage 67 which is slidingly guided by the two guides 61. Attached to the guides 61, by means of a flange 62, is the second electric motor 60 which, by means of the pinion 63 thereof, moves a conduit wheel 64 integral to a probe movement screw 65. Such screw 65 meshes with a nutscrew 66 which moves the carriage 67 vertically.

Advantageously, probe 40 sanitization means may be included that are suitable for completely sanitizing the entire outer surface of the probe 40.

In more detail, a sanitizing/detergent fluid is inserted through a washing conduit 80 in a sleeve 81. Such fluid, when the probe 40 is arranged at a wash window 82, may exceed the gasket 26.

According to the present invention, the annular gasket 21 comprises:

a first annular portion 21*a* intended to sealingly engage a first portion 11*a* of the abutment seat 11; and a second annular portion 21*b* intended to sealingly engage a second portion 11*b* of the abutment seat 11 within a predefined axial excursion of the shutter 20.

The annular gasket 21 therefore defines two different areas for sealing against the abutment seat. A first sealing area is defined by the first annular portion 21*a*, whilst the second sealing area is defined by the second annular portion 21*b*.

Figure 3:
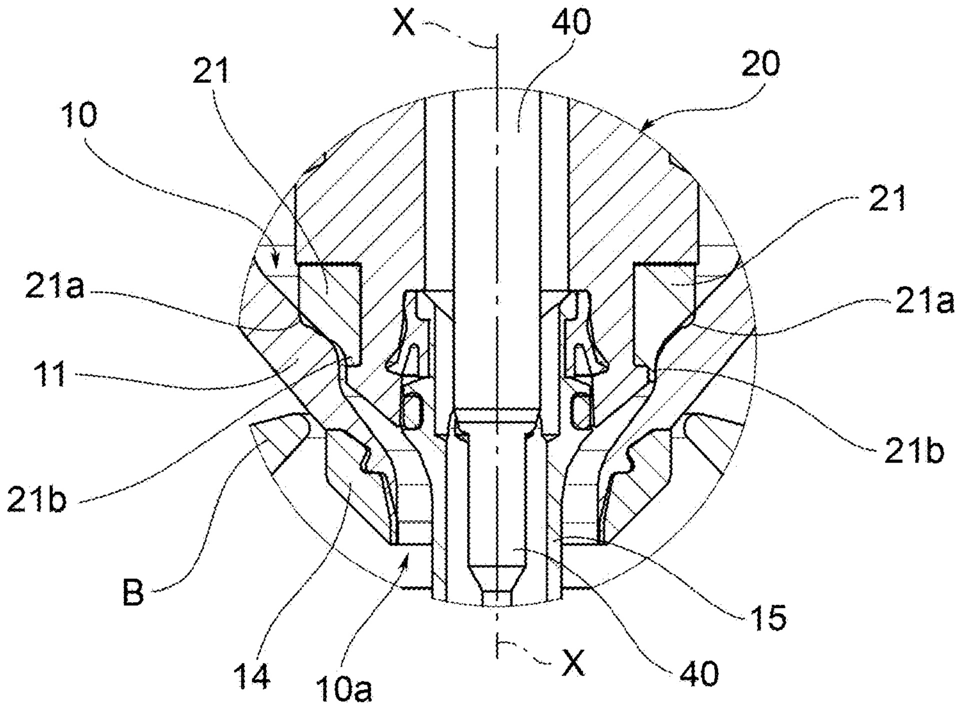
FIG. 3 shows an enlarged view of a detail from FIG. 2, enclosed in the circle denoted therein by III and in relation to the final portion of the adduction conduit.
Figure 4:
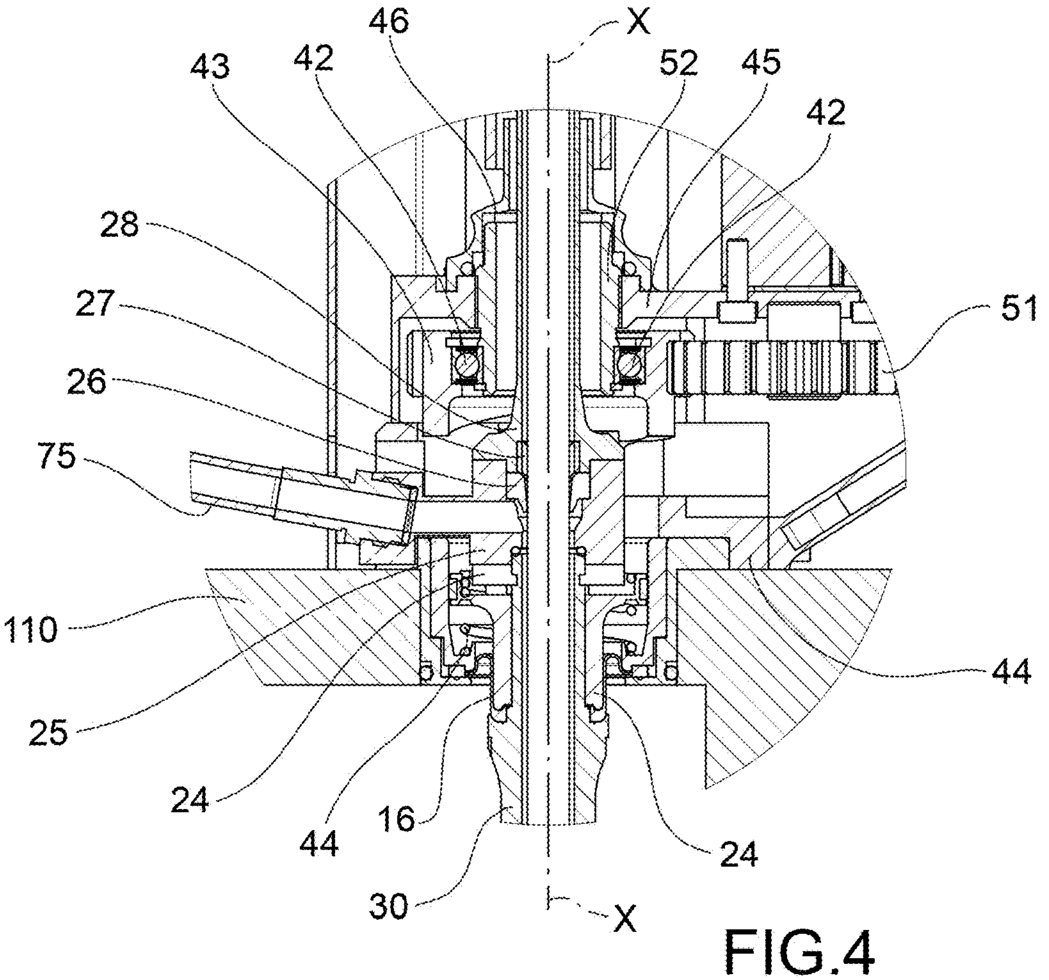
FIG. 4 shows an enlarged view of a detail from FIG. 2, enclosed in the circle denoted therein by IV and relating to a portion of the valve assembly arranged in proximity to the top of the tank of the filling machine.

As shown in particular in FIG. 3, the second portion 11*b* of the abutment seat 11 is axially closer to the discharge mouth 10 in relation to the first portion 11*a* of the abutment seat.

The first annular portion 21*a* is axially arranged in relation to said second annular portion 21*b* in such a way as to seal with the first portion 11*a* of the abutment seat 11 (within said predefined axial excursion of the shutter) when the second annular portion 21*b* has already started to sealingly engage the second portion 11*b* of the abutment seat 11.

In other terms, the second annular portion 21*b* of the annular gasket 21 is axially sized in such a way that, within said predefined axial excursion of the shutter, the second annular portion 21*b* is at least partially sealingly engaged with the second portion 11*b* of said abutment seat, even when said first annular portion 21*a* is spaced apart from the first portion 11 a of the abutment seat and is not able to make a seal therewith.

In more detail, following the sequence of FIGS. 8, 9 and 10, in the axial displacement of the shutter from an opening position (FIG. 8) to a closing position (FIG. 10) the portion of the gasket that first makes a seal against the abutment seat is the second annular portion 21*b*. The first annular portion 21*a* makes a seal when the second annular portion 21*b* is already under sealed conditions. In the opposite sequence, i.e., for the axial displacement of the shutter from a closing position (FIG. 10) to an opening position (FIG. 8) the portion of the gasket that first interrupts the seal against the abutment seat is the first annular portion 21*a*. The second annular portion 21*b* is still sealed whilst the first annular portion 21*a* has separated from the abutment seat 11.

Again according to the invention, at least one flow window 22 is provided on said second annular portion 21*b*, which interrupts the annular continuity of the second annular portion 21*b*.

Preferably, a single flow window is obtained on the second annular portion 21*b*. Embodiments may be envisaged wherein two or more flow windows, separate one from the other, are obtained on the second annular portion 21*b*. Hereinafter, for simplicity, reference will be made to the preferred case of a single flow window, without, however, excluding the possibility of having two or more flow windows.

Operationally, the flow window 22 enables a partialized flow of liquid through the adduction conduit when said first annular portion 21*a* is still spaced apart from the abutment seat and is not able to make a seal, as shown in FIGS. 9, 9*a* and 9*b*.

Operationally, when the first annular portion 21*a* is still spaced apart from the abutment seat and cannot make a seal and the second annular portion 21*b* makes a seal with the abutment seat 11, the flow of liquid within the adduction conduit 10 is limited to the flow that passes through the flow window 22. In such operational situation the flow rate of the filling flow is therefore proportional to the free cross section of the flow window 22.

By virtue of the flow window it is therefore possible to obtain, in a reproducible manner, a partialized flow through the adduction conduit by associating it with a predefined axial portion of the shutter relative to the abutment seat.

Advantageously, the partialized flow may be extremely reduced compared to the flow of liquid corresponding to a completely open shutter position. The value of the partialized flow (associated with a predefined axial position of the shutter in relation to the abutment seat) is fixed by opportunely sizing the free flow cross section of the flow window 22. Once the free flow cross section of the flow window 22 has been fixed, it is possible to regulate the flow rate of the partialized flow by varying the axial position of the shutter in relation the abutment seat, remaining within said predefined axial excursion of the shutter.

In accordance with the preferred embodiment, shown in the accompanying figures, the first portion 11*a* of the abutment seat 11 has a truncated-conical shape converging towards the discharge mouth 10*a*, whilst the second portion 11*b* of the abutment seat 11 has a cylindrical shape and connects the first truncated-conical portion 11*a* to said discharge mouth 10*a*.

Operationally, the first annular portion 21*a* of the annular gasket 21 seals against the first portion 11*a* of the abutment seat by abutting against the first truncated-conical portion. The seal derives from the compression sustained by the first annular portion 21*a* due to the axial movement of the shutter 20 along the valve axis.

Operationally, the second annular portion 21*b* of the annular gasket 21 has a cylindrical shape and seals against the second cylindrical portion 11*b* inserting itself with an interference relationship inside the second cylindrical portion for a predefined axial excursion of the shutter. The seal derives from the interference between the gasket and the abutment seat and is not affected by the axial movements of the shutter within said predefined axial excursion of the shutter.

Advantageously, as shown in FIG. 11, the flow window 22 extends up to said first annular portion 21*a* by a connecting surface 21*c*.

Advantageously, the flow window 22 has a predefined angular amplitude. In the case wherein two or more flow windows are included the sum of the angular amplitudes of such windows has a predefined value.

The angular amplitude of said flow window 22 is preferably chosen as a function of the average dimensions of the neck of the bottles to be filled. The criterion is the following: the narrower the neck the lower the angular amplitude has to be of the flow window; the larger the neck, the greater the angular amplitude may be. The object is sizing the flow window in such a way to ensure a liquid flow rate that is such that, with the flow cross section of the neck of the bottle fixed, there is an ascent rate of the liquid within the neck that is sufficiently slow to ensure that between the instant wherein the probe comes into contact with the liquid and the instant wherein the shutter is completely closed, the quantity of liquid that descends is negligible in terms of a level increase. Advantageously, in the case wherein bottles of a varying format are to be treated (an internal neck diameter from 14.5 mm to 20 mm) the angular amplitude of the flow window 22 may be of between 280 e 32° so as to ensure an ascent rate of around 10 mm/s. In the case wherein only bottles with a narrow neck are to be processed (an internal neck diameter from 14.5 mm to 16 mm) it may be opportune to reduce the angular amplitude of the flow window in order to enable greater shutter regulation precision. In such case the angular amplitude of the flow window 22 may be less than 28°. In the case wherein only bottles with a wide neck are to be treated (an internal neck diameter from 18 mm to 20 mm) it may be opportune to increase the angular amplitude of the flow window in order to increase the filling speed using the same regulation of the shutter. In such case the angular amplitude of the flow window 22 may be less than 32°.

A valve assembly 1 provided with an annular gasket as described above and having the flow window 22 makes it possible to control the flow of fluid within a wider range of axial shutter displacements compared to a valve assembly equipped with a conventional gasket without a flow window.

In FIG. 13 there are two graphs relating to volumetric flow rate as a function of the opening extent of the shutter in a valve assembly with a shutter that is provided with a known water-tight gasket and in a valve assembly with a shutter according to the present invention that is provided with the water-tight gasket with a flow window, respectively.

In more detail, the graph with the diamond shaped points relates to the flow rate of the known type of valve assembly; the graph with the square shaped points relates to the flow rate of the valve assembly according to the present invention with a gasket provided with a flow window.

As may be seen during opening of a known type of valve assembly there is an initial opening stroke with a null flow rate that is due to the decompression of the sealing rubber and then suddenly, within a few hundredths of raising the shutter, the flow rate has already spiked up to 20 percent of the maximum value thereof. This is the reason why all modulating process valves are not normally used below 10-15% of opening, insofar as it is a poorly controllable area.

In the case, instead, of the valve assembly according to the present invention with a gasket provided with a flow window there is an increase in flow rate that is distributed over a greater, and therefore more manageable, range of shutter heights.

Being able to deliver flow rates of the order of 10 ml/s is essential to correctly manage the filling of some bottle formats. For example, when filling Bordeaux bottle necks, in order to have an ascent rate of the liquid within the neck that is sufficiently slow to ensure that between the instant wherein the probe comes into contact with the liquid and the instant wherein the shutter is completely closed, the quantity of liquid that descends is negligible, it is necessary to have a flow rate of less than 10 ml/s.

A machine 100 for filling containers with liquids according to the present invention will now be described.

The machine is intended for the bottling of containers B with gaseous or non-gaseous food liquids.

The filling machine 100 is inserted, in a completely traditional manner, into a bottling plant or line provided with multiple machines working in succession, and is arranged, in particular, downstream of a rinsing machine and upstream of a capping machine. The containers B are transferred from one machine to the other by means of transport lines, such as belt conveyors, or by means of conveying equipment such as star wheel conveyors, augers, etc.

In more detail, the filling machine 100 is conventionally provided with an input station where it receives the container to be filled from a first transportation line (by means, for example, of a first star wheel conveyor), and an output station, wherein the filled containers are released onto a second transportation line (by means, for example, of a second star wheel conveyor) in order to be conveyed towards a machine arranged downstream, such as a capping machine.

The filling machine 100 is provided with a support structure 120, whereupon a rotating turret 130 is revolvingly mounted and carried in rotation around an axis of rotation by means of motor means of a known type (not shown).

The rotating turret 130 is provided with a tank 110, preferably of an annular shape, wherein the liquid to be bottled is contained. In particular, the tank 110 is filled with the liquid to be bottled up to a certain height level, whereabove it is filled with an inert gas (for example nitrogen). Such inert gas is kept substantially at atmospheric pressure in case the filling machine 100 is of the gravity type, under slight vacuum in case the filling machine 100 is of the slight negative pressure type and under pressure in case the filling machine 100 is of the “isobaric” type for treating gaseous liquids.

The rotating turret 130 carries a plurality of peripherally mounted valve assemblies 1 uniformly distributed along the circumference thereof, and suitable for transferring the liquid from the tank 110 to the containers B therebelow to be filled, generally consisting of glass or plastic bottles.

In particular, the rotating turret 130 comprises a support base (not shown in the figures) that is rotationally associated with the support structure 120, preferably by means of a thrust bearing (not shown). In turn, the base supports the tank 110 by means of a plurality of columns that have the function of varying the distance between the base and the tank as a function of the height of the containers B to be filled.

The support base furthermore peripherally carries support means 140 for supporting the containers in relation to the valve assemblies 1 that are associated with the tank. Such support means 140 may be actuated so as to move between a first position, wherein they carry the mouth of the container B under sealed conditions with an adduction conduit 10 of the corresponding valve assembly 1, and a second position, wherein they receive the container B when they transit within the input station 3 of the filling machine 100. In particular, the support means 140 of the containers B comprise a plurality of support structures 141, peripherally mounted on the rotating turret 130 below corresponding valve assemblies 1 and intended to receive in support the containers B during the operational movement thereof upon the rotating turret 130.

Preferably, during the rotation of the rotating turret 130, each plate support structure 141 is driven so as to move itself between the first position and the second position by means of a fixed cam (not shown), arranged around the rotating turret 130, and acting with a shaped profile on a cam follower (consisting, for example, of an idle wheel) attached to the corresponding support structure 141. The support means 140 are of a traditional type and in being well known to a person skilled in the art will not be described in more detail.

The filling machine 100 of the present invention comprises a logic control unit 200 (preferably comprising a PLC) suitable for automatically managing the operation of the filling machine.

The rotating turret 130 comprises a plurality of manifolds and circuits with process fluids. Such manifolds and circuits are functional for performing the different operational steps involved in the filling cycle of the filling machine 100. To such end, each valve assembly 1 is fluidically connected to the plurality of circuits and manifolds by means of opportune control valves collectively indicated with V in the accompanying Figures.

The control valves V of each valve assembly 1 are preferably of a pneumatic type, and are actuated by means of the introduction of pressurized gas from a pressurized gas source (not shown) driven by the logic control unit 200 of the filling machine 100.

Preferably, in the case wherein the filling machine 100 is intended for filling using gaseous liquids (i.e., of the isobaric type), and the regulation of the level is performed by means of a probe, the operational steps of the filling cycle are the following:

- step 1): input of the container into the filling machine;
- step 2): sealed approaching of the container to a valve assembly 1;
- step 3): evacuating and rendering inert the container;
- step 4): pressurization of the container;
- step 5): filling the container;
- step 6): decompressing (or degassing) the container;
- step 7): separation of the container from the valve assembly; and
- step 8): exit of the container from the filling machine.

Generally, in the case wherein the filling machine 100 is of the gravity type or under slight vacuum, steps 4) and 6) are not included.

The operational steps listed above are well known to a person skilled in the art and will not therefore be described in greater detail.

Preferably, as a function of the filling cycle that the filling machine must perform, the rotating turret 130 of the filling machine 100 may therefore comprise all or part of the following circuits or manifolds:

- a vacuum circuit (for step 3) for evacuating;
- an inert gas circuit (for step 3) for rendering inert;
- a pressurized gas circuit (for step 4) for pressurizing;
- at least one manifold for discharging the pressure within the container (for step 6) for depressurizing; and
- a manifold for discharging the air exiting the container during filling, as an alternative to the tank.

The valve assemblies are valve assemblies 1 according to the invention and in particular as previously described.

The logic control unit 200 is programmed so as to manage each valve assembly during the filling of the respective container according to predefined operating steps, regulating the axial position of the shutter and the axial position of the probe by means of the first movement means 50 and the second movement means 60, respectively.

The advantages deriving from such configuration have already been expounded upon in describing the valve assembly 1 according to the invention and will not, for brevity, be expounded upon again.

The logic control unit 200 is preferably programmed to manage each valve assembly during the filling of the respective container according to the following operational steps:

- (a) moving the shutter 20 along the valve axis X by driving the first electric motor 50 to bring the shutter from the closing position to a full opening position so as to carry out a fast filling step of the container;
- (b) moving the probe 40 along the valve axis X by driving the second electric motor 60 to bring the probe from the retracted position to a first extracted position in which the probe tip is positioned at a predefined intermediate filling level which is lower than the desired filling level;
- (c) when the probe detects that the liquid has reached the intermediate filling level, moving the shutter 20 along the valve axis X by driving the first electric motor 50 to move the shutter from the full opening position to a partial opening position so as to pass from a fast filling step to a slow filling step of the container;
- (d) simultaneously with step (c), moving the probe 40 along the valve axis X by driving the second electric motor 60 to bring the probe from the first extracted position to a second extracted position in which the probe tip is positioned at the desired filling level; and
- (e) when the probe detects that the liquid has reached the desired filling level, moving the shutter 20 along the valve axis X by driving the first electric motor 50 to bring the shutter from the partial opening position to the closing position so as to interrupt the filling.

Preferably, step (b) is carried out with step (a) already started.

Advantageously, the logic control unit 200 may be programmed to manage each valve assembly during the filling of the respective container with one or more steps of partializing the flow at different filling levels of the container B. Such steps of partializing the flow may be conducted before and/or after the fast filling step (step a) and before the final slow filling step (step c).

Advantageously, the logic control unit 200 may be programmed to manage each valve assembly during the filling of the respective container with a further operating step (f) which is conducted before said step (a) and which includes moving the shutter 20 along the valve axis X by driving the first electric motor 50 to move the shutter from the closing position to a partial opening position so as to start a slow filling step of the container.

Preferably, the logic control unit 200 may be programmed to regulate the predefined intermediate filling level as a function of the format of the container treated in each valve assembly and/or based on the foaminess of the liquid, based on preset data.

Preferably, the logic control unit 200 may be programmed to regulate the axial position taken by the shutter and thus the flow section as a function of the desired liquid flow rate during a specific filling step of the container, based on preset data.

Advantageously, the filling may not only be managed using partialization of the flow rate but also using multiple partializations using multiple level detection points. For example, after the fast filling step, a first partialization of the flow rate may be performed (40% of the flow rate for example) at a first filling level having, for example, the objective of absorbing the foam. Subsequently, having reached a second filling level (greater than the first by some centimeters), partialize again within the last section in order to make the final level. In other terms, those points wherein the liquid is detected using the probe may also be more than two.

The present invention allows numerous advantages to be obtained, which have already been described in part.

The valve assembly for a filling machine according to the present invention makes it possible to regulate the dispensing of liquid even at low flow rates.

The valve assembly according to the present invention is simple and economical to manufacture.

The invention thus conceived therefore achieves the intended objectives thereof.

Obviously, in practice it may also assume different forms and configurations from the one illustrated above, without thereby departing from the scope of protection described and claimed herein.

Furthermore, all details may be replaced with technically equivalent elements, and the dimensions, shapes, and materials used may vary according to the needs.

What is claimed is:

1. A valve assembly for a filling machine for filling containers with liquids, the valve assembly being suitable to regulate a filling of a container with a liquid contained in a tank of the filling machine and comprising:

an adduction conduit extending along a valve axis and fluidically connectable to the tank of said filling machine to allow an inflow of said liquid from the tank to the container to be filled through a discharge mouth;

a shutter suitable to regulate the inflow of said liquid in said container, the shutter being movably placed inside said adduction conduit to be moved along the valve axis between a closing position, in which the shutter intercepts the adduction conduit closing a flow section towards the discharge mouth, and one or more opening positions, in which the shutter does not intercept or only partially intercepts the adduction conduit leaving the flow section towards the discharge mouth open;

wherein said shutter comprises an annular gasket which with said shutter in the closing position sealingly engages an abutment seat provided inside said adduction conduit near the discharge mouth and is concentric to the valve axis, wherein said annular gasket comprises:

a first annular portion configured to sealingly engage a first portion of the abutment seat; and a second annular portion configured to sealingly engage a second portion of the abutment seat within a predefined axial excursion of the shutter, wherein the second portion of the abutment seat is axially closer to the discharge mouth with respect to the first portion of the abutment seat, wherein said first annular portion is axially positioned with respect to said second annular portion so as to make a seal with the first portion of the abutment seat when said second annular portion has already begun to sealingly engage the second portion of the abutment seat, and wherein at least one flow window provided on said second annular portion interrupts an annular continuity of the second annular portion, said at least one flow window allowing a partialized flow of the liquid through the adduction conduit when said first annular portion is still spaced from the abutment seat and cannot make the seal.

2. The valve assembly of claim 1, wherein the first portion of the abutment seat has a truncated-conical shape converging towards the discharge mouth, and wherein the second portion of the abutment seat has a cylindrical shape and connects the first truncated-conical portion to said the discharge mouth.

3. The valve assembly of claim 2, wherein the first annular portion of the annular gasket seals against the first portion of the abutment seat abutting against the first truncated-conical portion of the abutment seat.

4. The valve assembly of claim 2, wherein the second annular portion of the annular gasket has a cylindrical shape and seals against the second cylindrical portion inserting with an interference relationship inside the second cylindrical portion of the abutment seat for a predefined axial excursion of the shutter.

5. The valve assembly of claim 1, wherein said at least one flow window extends up to said first annular portion by a connecting surface.

6. The valve assembly of claim 1, wherein said at least one flow window has a predefined angular amplitude.

7. The valve assembly of claim 1, wherein said valve assembly further comprises a tubular control stem of the shutter, internally defining a conduit axially extended along the valve axis and open at both ends, the tubular control stem being configured to cross the tank to protrude below the tank with a lower end inside the adduction conduit and above the tank with an upper end, said shutter being coaxially associated with the lower end of said tubular control stem.

8. The valve assembly of claim 7, further comprising first movement means for moving the shutter, the first movement means being kinematically connected to the tubular control stem.

9. The valve assembly of claim 7, wherein said valve assembly further comprises a device for controlling a filling level of the container, coaxially inserted inside the conduit defined by the tubular control stem to be moved between at least one extracted position, in which the device exits from said conduit so as to be inserted inside the container, and a retracted position, in which the device does not exit from said conduit so as not to engage the container.

10. The valve assembly of claim 9, further comprising second movement means for moving the device for controlling the filling level of the container, the second movement means being kinematically connected to said device.

11. The valve assembly of claim 9, wherein said device for controlling the filling level of the container consists of a gas return cannula that is fluidically selectively connectable to the tank or to a plurality of circuits of the filling machine by respective valves.

12. The valve assembly of claim 9, wherein said device for controlling the filling level of the container consists of a level detection probe.

13. The valve assembly of claim 12, wherein between an internal wall of the tubular control stem and the level detection probe, an annular gap is defined which acts as an air return conduit and is fluidically selectively connectable to the tank or to a plurality of circuits of the filling machine by respective valves.

14. A filling machine for filling containers with liquids, comprising:

a support structure;

a rotating turret rotatably mounted on said support structure, and provided with a tank for containing a liquid to be bottled in the containers;

a plurality of valve assemblies peripherally mounted on said rotating turret, each valve assembly of plurality of valve assemblies being suitable for filling a respective container; and a logic control unit suitable to automatically manage operation of said filling machine, wherein each valve assembly of said plurality of valve assemblies comprises:

an adduction conduit extending along a valve axis and fluidically connectable to the tank of said filling machine to allow an inflow of said liquid from the tank to the container to be filled through a discharge mouth;

a shutter suitable to regulate the inflow of said liquid in said container, the shutter being movably placed inside said adduction conduit to be moved along the valve axis between a closing position, in which the shutter intercepts the adduction conduit closing a flow section towards the discharge mouth, and one or more opening positions, in which the shutter does not intercept or only partially intercepts the adduction conduit leaving the flow section towards the discharge mouth open;

wherein said shutter comprises an annular gasket which with said shutter in the closing position sealingly engages an abutment seat provided inside said adduction conduit near the discharge mouth and concentric to the valve axis, wherein said annular gasket comprises:

a first annular portion configured to sealingly engage a first portion of the abutment seat; and a second annular portion configured to sealingly engage a second portion of the abutment seat within a predefined axial excursion of the shutter, wherein the second portion of the abutment seat is axially closer to the discharge mouth with respect to the first portion of the abutment seat, wherein said first annular portion is axially positioned with respect to said second annular portion so as to make a seal with the first portion of the abutment seat when said second annular portion has already begun to sealingly engage the second portion of the abutment seat, and wherein at least one flow window provided on said second annular portion interrupts an annular continuity of the second annular portion, said at least one flow window allowing a partialized flow of the liquid through the adduction conduit when said first annular portion is still spaced from the abutment seat and cannot make the seal, and wherein the logic control unit is programmed so as to manage each valve assembly during filling of the respective container according to predefined operating steps, regulating an axial position of the shutter and an axial position of a device for controlling a filling level of the container by first movement means and the second movement, respectively.

15. The filling machine of claim 14, wherein the logic control unit is programmed to manage each valve assembly during the filling of the respective container with one or more steps of partializing flow of the liquid at different filling levels of the container.

16. The valve assembly of claim 11, wherein the valves are installed in a valve block.

17. The valve assembly of claim 13, wherein the valves are installed in a valve block.

* * * * *